(12) United States Patent
Curtis

(10) Patent No.: US 6,631,521 B1
(45) Date of Patent: Oct. 7, 2003

(54) SYSTEM, METHOD, AND PROGRAM FOR PERFORMING PROGRAM SPECIFIC OPERATIONS DURING THE UNINSTALLATION OF A COMPUTER PROGRAM FROM A COMPUTER SYSTEM

(75) Inventor: Bryce Allen Curtis, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/280,373

(22) Filed: Mar. 29, 1999

(51) Int. Cl.[7] .............................................. G06F 9/445
(52) U.S. Cl. ...................... 717/175; 717/169; 717/166; 710/8
(58) Field of Search ............................... 713/2; 707/203; 709/220–221, 223; 717/168–178, 166; 710/8

(56) References Cited

U.S. PATENT DOCUMENTS 5,768,566 A * 6/1998 Harikrishnan et al. ........ 717/11
5,872,979 A * 2/1999 Edel et al. ..................... 717/11
5,930,514 A * 7/1999 Thompson et al. ............ 717/11
5,966,540 A * 10/1999 Lister et al. ................... 717/11

OTHER PUBLICATIONS

Indigo Rose Software Design Corp. "Setup Factory 4.0" User's Guide, 1998.

* cited by examiner

*Primary Examiner*—Tuan Q. Dam
*Assistant Examiner*—Chuck Kendall
(74) *Attorney, Agent, or Firm*—David W. Victor; Konrad Raynes Victor & Mann LLP

(57) ABSTRACT

Disclosed is a system, method, and program for uninstalling an installed program comprised of installed components installed from file sets. A call is made to a first uninstall program to uninstall the installed program. The first uninstall program is in a first directory. A call is then made to a class loader to load a second uninstall program. The second uninstall program is maintained in a second directory. The first uninstall program processes the file sets to determine installed components to remove, and deletes the installed components. A call is made from the first uninstall program to the second uninstall program to perform uninstall operations.

30 Claims, 3 Drawing Sheets

SYSTEM, METHOD, AND PROGRAM FOR PERFORMING PROGRAM SPECIFIC OPERATIONS DURING THE UNINSTALLATION OF A COMPUTER PROGRAM FROM A COMPUTER SYSTEM

CROSS-REFERENCE TO RELATED APPLICATIONS

This application is related to the following co-pending and commonly/assigned patent applications, which applications were filed on the same date herewith, and which applications are incorporated herein by reference in their entirety:

"A Cross-Platform Program, System, and Method Having a Global Registry Object for Mapping Registry Equivalent Functions in an AIX Operating System Environment," having Ser. No. 09/280,345;

"A Cross-Platform Program, System, and Method Having a Global Registry Object for Mapping Registry Equivalent Functions in an OS/2 Operating System Environment," having Ser. No. 09/280,350;

"A Cross-Platform Program, System, and Method Having a Global Registry Object for Mapping Registry Functions in a Windows Operating System Environment," having Ser. No. 09/280,349;

"Global Registry Object for Mapping Registry Functions and Registry Equivalent Functions Across Multiple Operating Systems in a Cross-platform Program," having Ser. No. 09/280,371;

"A Cross-platform Program, System, and Method Having a System Independent Registry for Use on Operating Systems Irrespective of a Registry Equivalent," having Ser. No. 09/280,368;

"A System, Method, and Program for Enabling a Use of Property Object Having a Variable for a Property Value in a Cross-Platform Program," having Ser. No. 09/280,344;

"A System, Method, and Program for Overriding Program Properties," having Ser. No. 09/280,346;

"A System, Method and Program for Providing an Object-Oriented Install Architecture," having Ser. No. 09/280,352;

"A System, Method, and Program for Automatic Error Detection While Utilizing a Software State Machine for Carrying out the Process Flow of a Software Program," having Ser. No. 09/280,375;

"A System, Method, and Program for Utilizing a Software State Machine for Carrying Out the Process Flow of a Software Program," Ser. No. 09/280,376;

"A System, Method, and Program for Enabling a Software Program to Automatically Select a System-dependent Function," having Ser. No. 09/280,369;

"A System, Method, and Program for Mapping a Global Object to Desktop Elements of Different Operating Systems," having Ser. No. 09/280,372;

"A System, Method, And Program For Processing Dependencies Using a Dependency Object," having Ser. No. 09/280,370;

"A System, Method, and Program for Modifying a Text File," having Ser. No. 09/280,348;

"A System, Method, and Program for Updating Registry Objects With a Cross-platform Installation Program," having Ser. No. 09/280,351;

"A System, Method, and Program For Preserving Background Settings During Install and Uninstall Operations," having Ser. No. 09/280,374;

"A System, Method, And Program for Modifying a Library Object," having Ser. No. 09/280,347;and "A System, Method, And Program For Installation on Drives Using a Drive Object," having Ser. No. 09/280,353.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a method, system, and program for performing program specific operations during the uninstallation of a program from a computer system.

2. Description of the Related Art

An installer program is a software program that enables a programmer to write specific code to install a given application program onto the drives of a computer in a way that enables the given application program to work correctly with the computer's environment, including its operating system. There are several types of installers Java installers and operating system specific installers, e.g., Microsoft Windows installers, and International Business Machines ("IBM") OS/2 and AIX operating system installers, etc. Many of the install programs existing today have various limitations in their functionality as discussed below.

One type of Java installer is provided by a software company known as InstallShield. Currently, the functionality and configurability of this Java installer is somewhat limited. For example, the Java installer provides default panels, but the text cannot be changed or configured. Also, this Java installer is not easy to customize. In other words, a programmer cannot easily add a function that is not provided by the installer program. In addition, the current Java installer provides only limited registry support. A registry is a central repository for all possible information for the computer such as hardware configurations and software settings, etc. The registry maintains information on installed components. A programmer or user can access the registry to determine information about installed products, based upon what the user/programmer placed into the registry or what information is useful to the user. Presently, the Java installer only works with a Microsoft Windows' registry; and the support provided with Microsoft Windows is limited. For example, the current Java installer does not enable the Windows' system registry to be updated directly. Instead, the keys to update in the registry are in a file which must be imported into the registry through a system call. It would be desirable if such a Java installer program supported multiple directories, splash screens (which are images that come up while a software product is being installed), and multiple languages instead of only English. Furthermore, it would be desirable for a given installer program to be more broadly applicable to other environments and operating systems. Although InstallShields' Java installer is tailored to Java, it is also geared somewhat for the Windows' operating system as discussed above in terms of the Windows' registry support provided. However, it does not provide specific support for other operating systems such as the IBM OS/2 and AIX operating systems.

Another Java installer is called "Install Anywhere" from ZeroG. This Java installer program also has a default panel that is not configurable, e.g., the order in which panels appear is not customizable. Likewise, registry support is limited. A user/programmer updates a registry from a file using a "reg_edit" command. Although this installer program enables a user/programmer to add a few items into the registry, the registry cannot be queried. In addition, other registry functional features are not available. Likewise, there is no multiple directory support, and no national language support. Also, it does not support multiple operating systems, i.e., there is no OS/2 or AIX specific support.

Another approach would be to provide install APIs for Java. However, this approach is not yet available.

With respect to operating system specific installers, InstallShield provides a Microsoft Windows' 32 installer, e.g., Microsoft Windows 95/98 and NT. Although this installer program is widely used throughout the industry, it is based upon a proprietary scripting language developed by InstallShield. The scripting language is similar to Basic programming language. Programmers, who generally have experience and knowledge of object oriented programs such as C++ and Java, must learn this proprietary InstallShield script, which is not related to the popular computer languages, in order to program an Install program. This unfamiliarity with the proprietary InstallShield scripting language complicates the installer programming process.

One hindrance to developing a cross platform uninstaller is that certain uninstall operations may need to be performed that are not performed by the general uninstaller. Further, problems may arise in developing a cross platform uninstaller that works across operating systems that support long file names and those that do not, such as 8.3 file systems. There is thus a need in the art to provide uninstaller programs to allow cross-platform uninstallations.

SUMMARY OF THE PREFERRED EMBODIMENTS

To overcome the limitations in the prior art described above, preferred embodiments disclose a system, method, and program for uninstalling an installed program comprised of installed components installed from file sets. A call is made to a first uninstall program to uninstall the installed program. The first uninstall program is in a first directory. A call is then made to a class loader to load a second uninstall program. The second uninstall program is maintained in a second directory. The first uninstall program processes the file sets to determine installed components to remove, and deletes the installed components. A call is made from the first uninstall program to the second uninstall program to perform uninstall operations.

In further embodiments, the first uninstall program is a general uninstall program that applies across programs to uninstall. The second uninstall program includes code to perform uninstall operations specific to the program being uninstalled.

In still further embodiments, the second uninstall program is stored with a file name compatible with different file systems. In such case, the calling of the class loader comprises assigning a variable to the second uninstall program. The first uninstall program uses the variable to call a method in the second uninstall program to perform uninstall operations. In yet further embodiments, the second uninstall program is stored with a file name compatible with FAT16 file systems and the first uninstall program is saved with a long file name.

The second uninstall program may be called before the first uninstall program deletes the installed components, after all the installed components for the program are deleted or at other instances during the uninstallation process.

Preferred embodiments provide a class or program for performing program specific uninstallation operations not performed by the generic uninstaller that removes installed components indicated in the file sets used to install the program. The generic uninstaller can operate across platforms. The program specific uninstall program is loaded to allow the generic uninstaller to access the program specific uninstall operations. Further, to provide cross-platform operability with file systems that only support short file names, i.e., 8.3 file systems, the preferred embodiments name the program specific uninstall program using the 8.3 naming convention in order to allow the uninstall program of preferred embodiments to operate on operating systems that do not support long file names.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
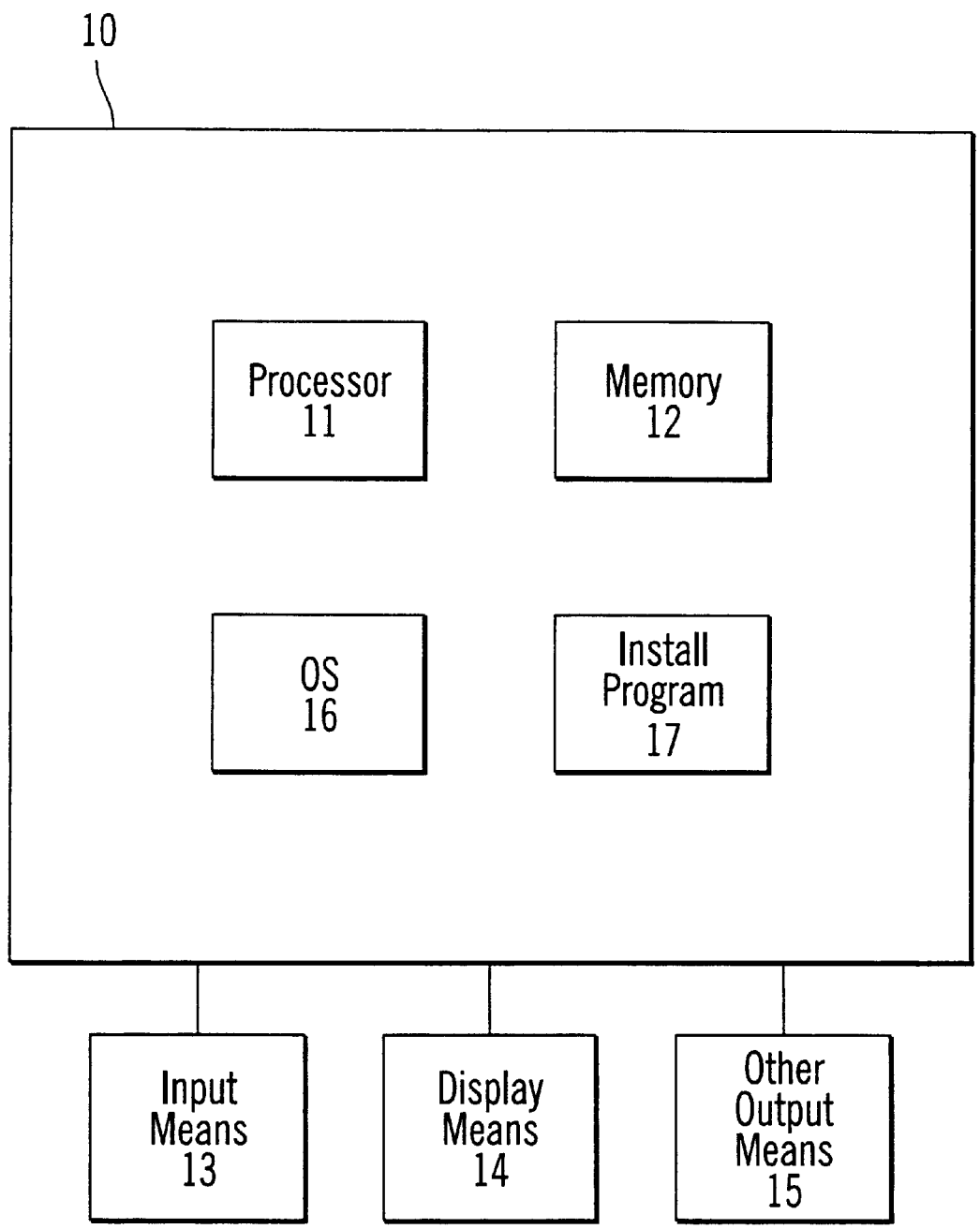
FIG. 1 is a block diagram illustrating a software and hardware environment in which preferred embodiments of the present invention are implemented.

With reference to FIG. 1, a block diagram of a data processing system 10, i.e., computer system, in which a preferred embodiment of the present invention may be implemented is depicted. The computer includes a processor 11 and memory 12. The computer 10 may be, but is not limited to, a personal computer, workstation, or a mainframe. The computer system also includes input means 13 such as a keyboard and/or mouse and/or track ball and/or light pen and/or pen-stylus and/or voice-sensitive device and/or touch-sensitive device, and/or other pointing devices and/or other input means. Also included are display means 14 such as a display monitor and other output means 15 such as printers, etc. Memory 12 includes volatile or nonvolatile storage and/or any combination thereof. Volatile memory may be any suitable volatile memory device known in the art, e.g., RAM, DRAM, SRAM, etc. Nonvolatile memory may include storage space, e.g., via the use of hard disk drives, for programs, whether or not the programs are being executed.

The programs in memory 12 includes an operating system (OS) 16 program and application programs, such as an install program 17 or an installer tool kit. If the memory 12 is comprised of volatile and nonvolatile memory devices, then data and programs may be swapped between the volatile and nonvolatile devices in a manner known in the art.

The exemplary embodiment shown in FIG. 1 is provided solely for the purposes of explaining the invention and those skilled in the art will recognize that numerous variations are possible, both in form and function. For instance, any one or more of the following —the processor and/or memory and/or the input/output devices —could be resident on separate systems such as in a network environment. Any such variation to FIG. 1 is within the sprit and scope of the present invention. The computer system and parts thereof depicted in the figures and described below, and the Java implementations described herein, are provided solely as examples for the purposes of explanation are not intended to necessarily imply architectural limitations. Those skilled in the art will recognize the numerous programming languages which may be utilized, all of which are believed to be embraced within the spirit and scope of the invention.

Figure 2:
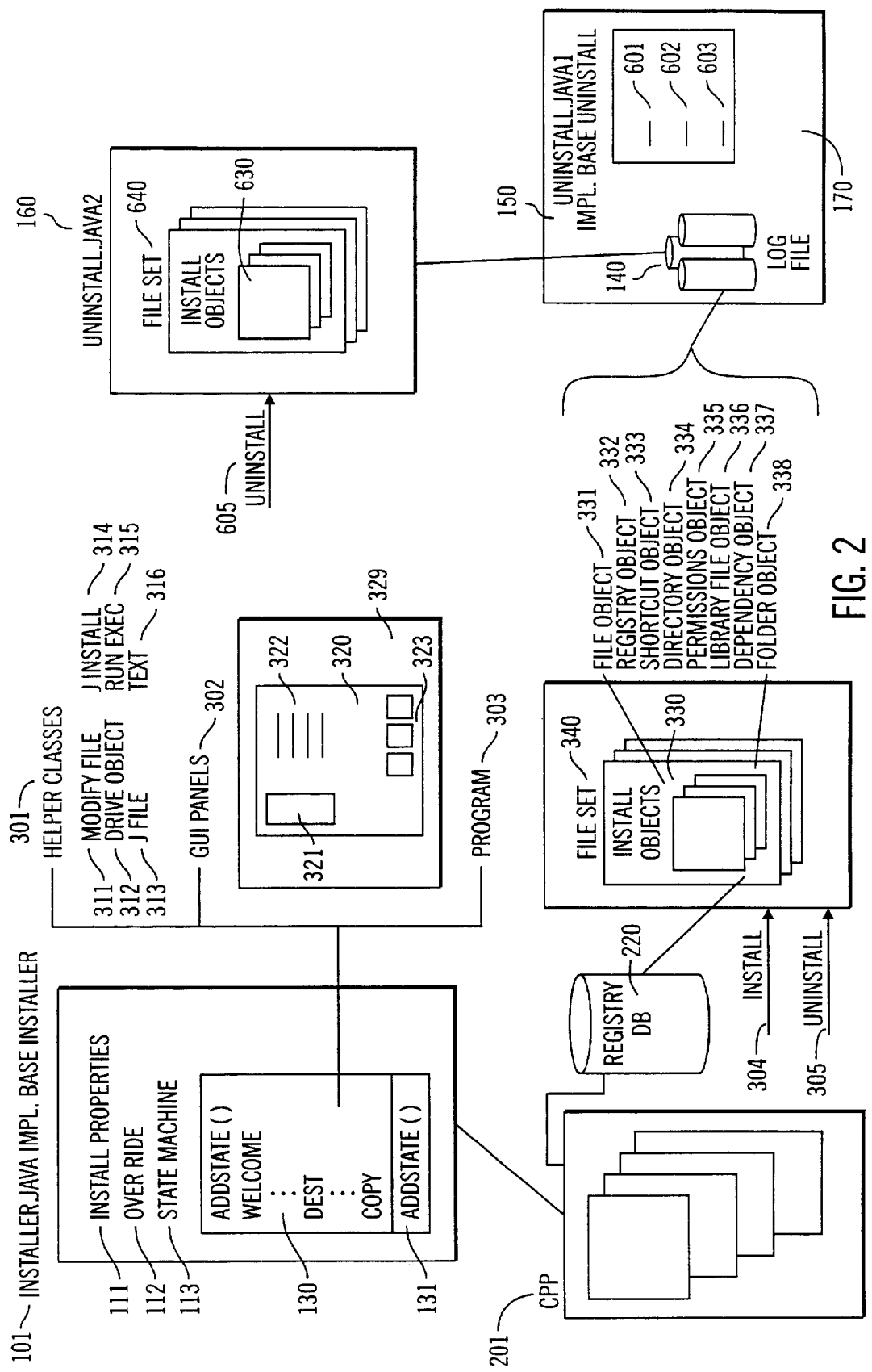
FIG. 2 is a block diagram illustrating structural components of the installer program in accordance with preferred embodiments of the present invention.

The system, method and program of a preferred embodiment of this invention enables the creation of a cross-platform installer program in accordance with the structural components and flow of FIG. 2.

A script, referred to herein as "installer.java", 101 FIG. 2, is used to run the install engine. The script implements the base installer class in Java. Within the script 101 there are the following entities: a) install properties 111; b) an override function 112; c) and a state machine 113. Within the state machine 113, there are various states 130 such as a welcome state, a destination state, a copy state, etc. This state machine includes an "add state method" 131 which is further used to check for errors. The following process takes place when the base installer class starts running: a) the properties are set up, 111, b) the properties are overridden, 112, and then c) the state machine 113 is executed. The program stays in the state machine until exited out. At exit, the program has either been successfully or unsuccessfully installed.

Within any given state 130 there are several objects. There are helper classes 301, GUI panels 302, and a program object 303.

Within the helper classes 301, there is a modify file class 311, a drive object class 312, a J file class 313, a J install class 314, a run exec class 315, and a text class 316. The modify file class 311 and drive object 312 will be discussed in more detail either below or in a related application. J file 313 is a class that enables actions to be performed with files and directories. J install 314 contains methods that enable access to environment variables and other similar activities. Run exec 315 is a class that enables the running of operating system calls. Text class 316 is a class that is used to handle national language support.

An example of a GUI panel 320 is shown in FIG. 2. There may be an image 321, text or controls 322 and buttons 323 such as back, next or cancel. The GUI panels 320 all extend a class calling a wizard dialog. They are displayed in a mainframe class 329. The mainframe class manages the screen display, e.g., gradient background color, gradient text. It also manages the splash screens and titles and other similar items including where they are being displayed. In other words, it manages the background image and screen image upon which the dialogs are displayed.

The install program further includes a program object 303 comprised of file set objects 340. Within each file set object 340 there are multiple install objects 330. There are several types of install objects—file object 331, registry object 332, shortcut object 333, directory object 334, permissions object 335, a library file object 336, a dependency object 337, and folder object 338. Other objects are also possible. All of these objects extend or implement install objects 330. In addition, all of the install objects have certain methods on each of them. In particular, each install object knows how to install or uninstall itself, how to log itself, and how to internalize from a log, i.e., how to build itself back up again from reading from a log.

The install process that the script 101 enables includes running the state machine 113 through various states 130 which cause different events to take place. For example, a GUI panel may pop up as part of the welcome state. During a destination state, another GUI panel may pop up on the screen that queries a user for the location of where to install the program. The install properties 111 may be used in the destination state by having a destination panel set a particular destination directory name of an install property to a particular directory. During the copy state, the program object 303 is built-up including all of the install objects 330. The install command 304 is then called on the program object. Each one of the file sets 340 and install objects 330 contains an install method. As such, by calling install 304 on the parent object, i.e., the program object 303, the program object goes through and calls install on all of the included file sets and install objects 340, 330.

Likewise, the uninstall process is also enabled by the script 160. For uninstall, there is an uninstall method on the file set 340 and on all of the other install objects 330. By calling uninstall 305 on the program 303, everything becomes uninstalled, i.e., the program, file sets and install objects.

It should be noted that during an install, each one of the install objects 330 is written out to a log file 140 which is put into a particular directory. At the same time that the install objects 330 log themselves to the log file, there is also another file, called "uninstall.Java1" 150 which implements a "base uninstall" class, which includes several methods that get called at different points during uninstall. During install, the log 140 and "uninstall.Java1" 150 information are built. The log file 140 and "uninstall.Java1" 150 are in the file system 170 on a particular directory. If it is uninstalled, the first thing that happens is that it reads into "uninstall.Java2" 160 the log files 140 and recreates the same structure 160 as the file sets 340 and install objects 330. It does not recreate the program object 303, but rather it recreates the structure of everything contained within the program object, i.e., file sets 640 and install objects 630. As a result, recreated from the log file 140 is a file set with all of the install objects that it contains. There is one log file for each file set. Directory 170 can be thought of as a container just like the program directory 303 is a container for the file set 340 and install objects 330. "Uninstall.java2" 160 builds up the file sets 640. Uninstall 605 is called by the uninstaller, and it goes through each file set and install object and uninstalls itself During the uninstall of each file set 640, the base uninstaller class 150 is called at the beginning and at the end of the file set. Therefore, at the beginning and ending of copying a file set 640, the installer makes a call to the base uninstaller class 150 at appropriate points 601, 602, 603.

There are certain platform specific operations that are taking place throughout the different objects, i.e., the helper classes 301, install objects 330, etc. Therefore, there is a platform specific module/interface. It is referred to herein as CPP 201. It defines a set of methods, that are representative of different operating systems, for functions that need to take place for an install. There are several different CPPs 211, 212, 213, . . . 219, etc., one for each operating system. For example, CPP Win 32, CPP OS/2, CPP Solaris, CPP Linux, and CPP AIX. There is also a CPP default. If the operating system is not implemented through a CPP, the CPP default is used. This CPP 201 is the platform specific code for the installer.

Since most platforms, i.e., operating systems, do not have a registry, a platform independent registry database class 220 is created which ties the platform specific code 201 with registry objects 332. The registry database 220 implements the registry function for those platforms which do not have a registry.

The installer tool kit of the preferred embodiment of this invention supports the Windows 32 operating systems including Windows 95, Windows 98 and NT 4.0. It also supports OS/2 Warp 4.0, OS390, AIX 4.1 and higher versions, Solaris and Linux 4.2. Although the structure of the preferred embodiment enables support for any given operating system or environment, future embodiments or further enhancements to the present preferred embodiment will enable full support for other operating systems such as NT 5.0, HP-UX, AS/400, or any other operating system. The installer program 17 or tool kit may be written in a script based object oriented programming language, such as Java. The developer may utilize the programming language commands to develop an install program according to the developer's specifications. In preferred embodiments, the developer may determine the program flow and the display of specific graphical user interface (GUI) panels. Furthermore, the tool kit enables a developer to perform functions on files and directories, e.g., to copy, read, create, modify, version and to batch files. With respect to registry functions, the tool kit enables a developer to write an install program that can read, create, modify, delete, and enumerate registries for the Windows operating system which is the only operating system that has a registry object. These same functions are provided for all other operating systems that do not have a registry, but do have registry equivalent functionality.

Other functions of the tool kit include i) providing install property objects that contain variables as values that become defined for a specific operating environment; ii) enabling a property value to be temporarily overridden; iii) a software state machine that enables a programmer to easily customize an install program by merely adding, deleting, or changing the various states that contain the functions and flow of control of the program; iv) automatically detecting a programming error if a programmer incorrectly specifies a non-existent state within the state machine; v) automatically selecting a system-dependent function; vi) a containment structure consisting of program object, fileset objects, install objects, where each fileset object and install object contains means to install and uninstall itself and to log itself; vii) enabling the management of folders, shortcuts and icons; viii) enabling environment variables to be read, created, modified and deleted; ix) providing dependency checking of prerequisite programs during both install and uninstall; and x) providing various logs, e.g. a log for keeping track of what is being installed, and a log that reports the progress of install. Logs are used for both the install and uninstall process. Furthermore, these logs are human readable which allows them to be checked, e.g., after a silent install, to ensure that a file has installed successfully. The tool kit also enables multiple destination directories to be installed from multiple source directories. For example, there can be multiple components of file sets included in an install where a file set is a separately installable/uninstallable piece of code or set of files.

The tool kit also enables an install program to undo an install, i.e., uninstall. In preferred embodiments, the steps of the install operation are maintained. In this way, if a second installation is performed over an initial installation, the changes made by the second installation are saved in a file. In this way, if the second installation is removed, the system may be restored to the state at the first installation using the information saved on the installation. In other words, a previous version is recovered when a latest version is uninstalled by replacing a backup of files.

Other features include a) a progress bar that shows the status during an install, b) splash screens which can be displayed during an install, c) national language support, d) the ability to perform unattended install from install scripts, and e) an install wizard. There are also twenty or so defining default panels that are available. It is also easy for a programmer to add a programmer's own panels without a lot of effort.

Preferred embodiments of the invention include a) an installer tool kit, including a system, method, and program, that enables the creation of install programs for any one of a plurality of operating systems as described herein, b) an install program that can be used for multiple platforms to install an application program on a specific operating system; i.e., the same install program can be used to install a similar application program on different operating systems, c) a method for carrying out the functions of the install program, and d) a computer system running the install program on a specific operating system for installing an application program. Other more general embodiments include a) any tool kit for enabling the creation of programs that are capable of running on more than one operating system, b) any program that is enabled for multiple platforms, c) methods carried out by cross platform programs, and d) a computer system running a program that is enabled for multiple platforms.

The above description presented an overview of the install program and how it works. The following describes, in more detail, various parts of the overall structure and process described above.

The Base Uninstaller

As discussed, uninstall.Java2 160 processes the FileSets 340 and install objects 330 of an installed program to uninstall the installed components. The uninstall.Java2 160 program, i.e., Java2 160, is the generic uninstaller that operates the same across different programs. Java2 160 processes the File Sets 340 and install objects 330 used to install the program by reading them in as FileSet 640 and Install Objects 630. Java2 160 also reads in the log files 140 and, then processes the FileSet 640 and Install Objects 630 to determine the installed components to remove. The same Java2 160 program is called to uninstall program FileSets 340 for all programs installed using the FileSet 340 structure. The uninstall.Java1 150 class, i.e., Java1 150, includes objects and methods that perform uninstall operations specific to the program being uninstalled. For instance, certain configuration files may need to be reconfigured and other files deleted in a manner that is unique to the program being uninstalled in order to restore the system to its pre-installation state. The code for such program specific uninstall operations is maintained in the Java1 program 150. The operations performed in the Java1 150 program may include delete operations, copying files, deleting database records, modifying configuration files, etc.

Because the Java1 150 program is unique to each installed program, in preferred embodiments, the Java1 150 program is maintained in a program specific directory, such as the program specific directory which maintains the log files 140 which are unique to each installed program or product. The directory path, thus, distinguishes the Java1 150 programs for each installed program because the same name, e.g., uninstall.Java1, is used to provide specific uninstall code for each installed program. The Java2 program 160 class is stored in a directory separate from the directory including the Java1 programs as Java2 160 is common to all installed programs. Java1 150, on the other hand, is maintained in a program specific directory that also includes the log files 140. The install objects 330 for an installed component include calls to the Java1 program 150 at certain instances to perform program specific uninstall operations.

The classpath variable for Java2 160 includes the directories including all the compiled java classes used by Java 2 160. As discussed, in preferred embodiments, this directory is common to all programs. Thus, when the Java2 program 160 is called to uninstall a program, Java2 160 can locate the FileSets 340 and install objects 330 for the program to uninstall as the install objects for all the installed components are maintained in the classpath for Java2. With this implementation of the Java2 class, the Java2 program 160 cannot make calls directly to the Java1 program 150 because Java1 150 is not in the classpath.

Preferred embodiments provide a class loader, described below, to load the Java1 150 class into the runtime environment of Java2 160 in order to allow Java2 160 to call Java1 to perform program specific uninstall operations.

Certain operating systems, such as DOS and Windows 3.1, do not allow for long file names. Such operating systems use the FAT16 file system, which provides for only 8.3 file names, or up to eight characters for the file name and three characters for the extension. However, all Java source files must use a four-letter extension, i.e., .JAVA. The preferred embodiment cross-platform installer is intended to work across operating systems, including FAT16 systems. To run the java installer and uninstaller of the preferred embodiments on such FAT16 file systems, the Java1 150 program must be capable of being executed within the operating system as it is called separately from the Java2 160 program. For this reason, the compiled Java1 150 program is saved in a file name compliant with such 8.3 file system, such as "uninsta.cla," to allow the operating system to execute Java1 150.

Preferred embodiments provide a class loader to load in the Java1 150 program uninsta.cla, such that the Java2 program 160 executing on the system can make calls to Java1 150 even though Java1 does not use the proper Java naming format. Below at (1) is pseudo code to load the Java1 class 150:

InstallClassLoader cl=new InstallClassLoader( );   (1)

ui=Java1 loadClass (logdir+"unista.cla").newInstance( ).

In the first line, the code calls the class loader that created the install class, e.g., "InstallClassLoader( )", to load the referenced class. The preferred program then sets a variable, "ui," to the compiled version of the Java1 150 program, or uninsta.cla. This allows Java2 160 to make calls to Java1, which has a file name in a non-Java format, e.g., 8.3, through the variable "ui." Thus, the variable "ui" provides the Java2 program 160 access to objects and methods in the class of the Java1 program 150.

The Java1 150 class, which is accessed by the Java2 150 uninstaller through the use of the variable "ui," includes three methods—init, start, and complete. The "init" method initializes the Java1 program 160 to allow Java1 to call objects and methods within the classpath of the Java2 program 160. In preferred embodiments, the method "init" has as a parameter the object that called init, which in preferred embodiments is Java2 160. The "init" method thus provides the methods and code executing in the program specific uninstaller, or base uninstaller.Java1 150, access to all the Java2 components and file sets.

A "start" method may be called right after a user selects an option on a graphical user interface (GUI) control panel displayed during uninstallation that provides the user the option to proceed with uninstallation. In preferred embodiments, after the user selects to proceed with uninstallation, the start method may be called, e.g., ui.start. The execution of this command will access a module within the program specific uninstaller uninsta.cla, i.e., the compiled version of Java1 150, to perform program specific uninstall operations, such as altering the configuration of system configuration files, deleting files, etc. For instance, the related patent application entitled "A System, Method, and Program for Modifying a Text File," having Ser. No. 09/280,348, described a ModifyFile Object including methods to modify system configuration files. The program specific uninstaller uninsta.cla may use these preferred embodiment object methods to modify the system configuration files to their pre-installation configuration. During installation, the FileSet may maintain information on any system configuration files that were modified and store such information within itself. This information may then be accessed from the FileSet by the program specific uninstaller uninsta.cla to determine which configuration files to modify during uninstallation.

The calling of the ui.start method may also change any user selected installation options. For instance, when the user installed the program, the user may have indicated whether to delete specific FileSets 340 or file sets during uninstallation. If a FileSet 340 was installed, then a flag associated with that FileSet would indicate whether the user selected to delete such file sets during later uninstallation. The program specific uninstaller Java1 150 may include code to modify the delete flag associated with a FileSet 340 to indicate that the corresponding FileSets 340 should be deleted or maintained on the system, regardless of the selection specified by a user. The program specific uninstaller Java1 may also be used to delete any program specific files that were created during use of the program being uninstalled and that will not be needed after the program is uninstalled. In preferred embodiments, the start method would be called before any installed components are removed to allow the program specific uninstaller uninsta.cla to alter any selections the user made concerning the removal of installed components. Thus, Java1 150 (uninsta.cla) would include a module accessed by a call to the start method that includes code for modification operations that should be performed at the beginning of the uninstall process.

The "complete" method is called after the Java2 completes uninstallation operations to perform final program specific uninstallation operations after all FileSets have been uninstalled by the generic uninstaller Java2 160. In preferred embodiments, uninstall actions occur in an order opposite to the order that the install steps were performed. Thus, the actions performed in uninsta.cla as a result of a call to ui.start would undo those installation steps performed at the end of the installation process. Whereas, those product specific uninstall steps performed as a result of a call to ui.complete would undo those install steps performed at the beginning of the installation process.

Figure 3:
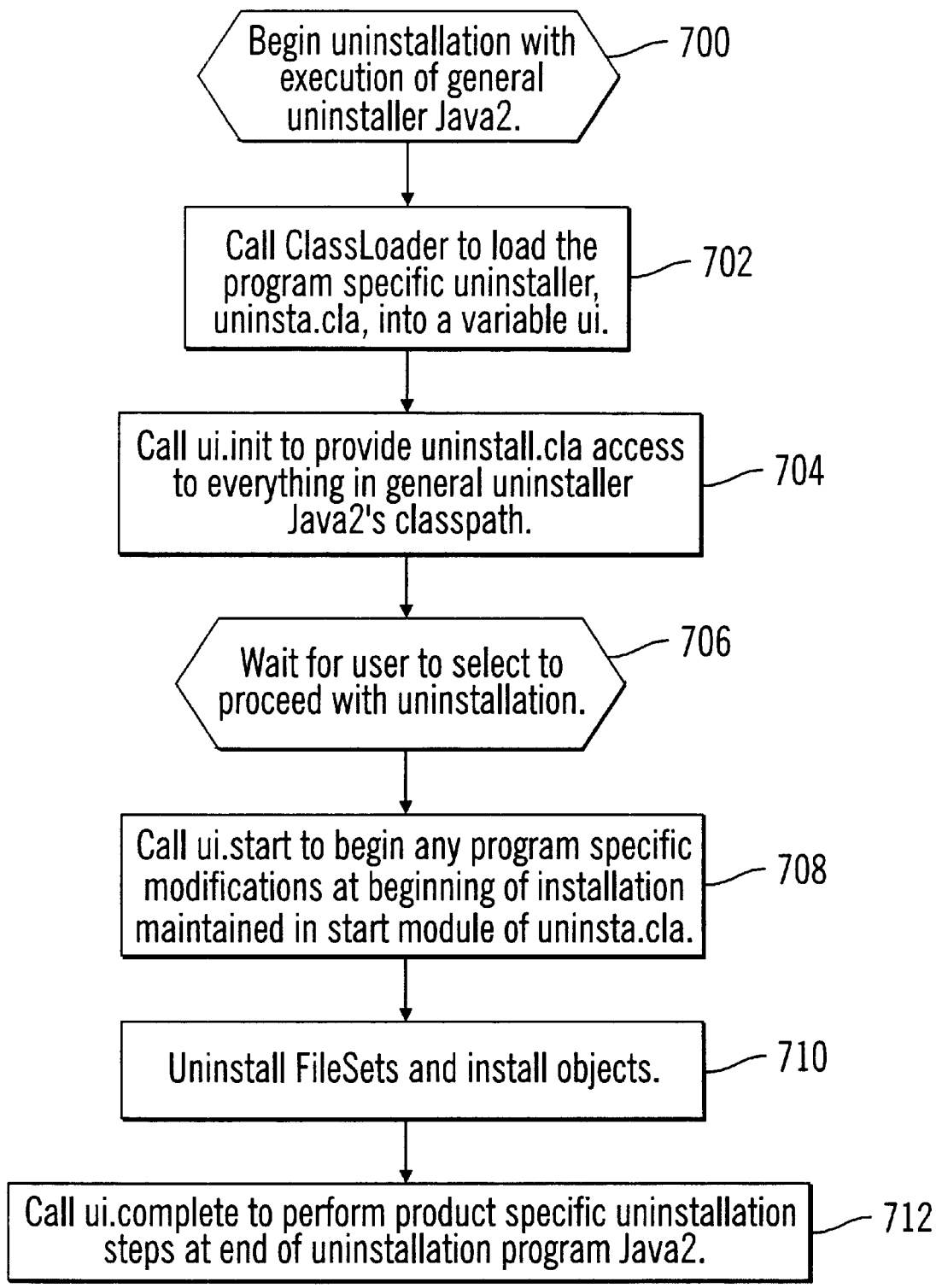
FIG. 3 illustrates logic to uninstall programs in accordance with preferred embodiments.

FIG. 3 illustrates logic implemented in Java2 160 to uninstall a program and make calls to the program specific uninstaller Java1 150. The uninstallation process begins (at block 700) with a call to the uninstaller Java2 160 to build up the FileSets 640 to uninstall. The uninstaller Java2 160 then makes a call (at block 702) to the class loader to load the program specific uninstaller Java1 150, which in preferred embodiments is stored on the system as "uninsta.cla," by assigning the variable "ui" to access the uninsta.cla file for the program being removed. Java2 160 then makes a call (at block 704) to ui.init to initialize the program specific uninstaller Java1 150 to provide the uninsta.cla file with access to all objects within the classpath of the uninstaller Java2 160. The uninstaller Java2 160 displays a GUI panel and waits (at block 706) for the user to select to proceed with the uninstallation.

Upon the user selecting to proceed with uninstallation, the uninstaller Java2 160 calls (at block 708) the ui.start method to execute any program specific uninstall operations in the start module of the program specific uninstaller Java1 150 or uninsta.cla. As discussed, such specific uninstall operations may comprise modifying configuration files, deleting certain files created by the product being uninstalled or overriding any user selections to remove files that should remain on the system. The uninstaller Java2 160 then proceeds to uninstall (at block 710) the installed components indicated in the FileSets 640 and other install objects 630. After completing the removal of the FileSets and install objects, the uninstaller Java2 160 makes a call (at block 712) to ui.complete to perform certain product specific uninstallation steps at the end of uninstallation.

Preferred embodiments thus provide a program mechanism for accessing certain product specific uninstallation functions maintained in a directory that is different from the directory including the general uninstaller program. Preferred embodiments further allow the program specific uninstaller to be stored in a format compatible with most operating system, including FAT16. This allows the program specific uninstaller to execute on such FAT16 file systems by providing a loader to provide the general uninstaller class Java2 access to the program specific uninstaller.

Preferred embodiments provide a cross-platform uninstaller that works across most operating systems and file systems, including FAT16 file systems, by providing a loader to provide the uninstall program with access to product specific uninstallation code.

Alternative Embodiments/Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

The program flow logic described in the flowcharts above indicated certain events occurring in a certain order. Those skilled in the art will recognize that the ordering of certain programming steps or program flow may be modified without affecting the overall operation performed by the preferred embodiment logic, and such modifications are in accordance with the preferred embodiments.

Preferred embodiments of the install program 17 and install kit were described as implemented in the Java programming language. However, any other object oriented programming language or other programming language may be used to implement the install program 17 and provide the user with tools to develop an install script.

Preferred embodiments were described with respect to a program specific uninstaller Java1, implemented in the Java computer language. However, in alternative embodiments the general and program specific uninstaller programs may be implemented in other computer languages.

In summary, preferred embodiments disclose a method, system, and program for uninstalling an installed program comprised of installed components installed from file sets. A call is made to a first uninstall program to uninstall the installed program. The first uninstall program is in a first directory. A call is then made to a class loader to load a second uninstall program. The second uninstall program is maintained in a second directory. The first uninstall program processes the file sets to determine installed components to remove, and deletes the installed components. A call is made from the first uninstall program to the second uninstall program to perform uninstall operations.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for uninstalling an installed program comprising installed components, wherein the installed components were installed from file sets, comprising:
    calling a first uninstall program to uninstall the installed program, wherein the first uninstall program is in a first directory;
    calling a class loader to load a second uninstall program, wherein the second uninstall program is maintained in a second directory;
    processing, with the first uninstall program, the file sets to determine installed components to delete;
    deleting, with the first uninstall program, the installed components; and
    calling, with the first uninstall program, the second uninstall program to perform uninstall operations.

2. The method of claim 1, wherein the first uninstall program is a general uninstall program that applies across programs to uninstall, and wherein the second uninstall program includes code to perform uninstall operations specific to the program being uninstalled.

3. The method of claim 1, wherein a classpath for the first uninstall program includes the first directory, wherein the second directory is not included in the classpath.

4. The method of claim 1, further comprising calling an initialization method after loading the second uninstall program wherein the initialization method provides the second uninstall program access to all objects and methods to which the first uninstall program has access.

5. The method of claim 1, further comprising determining whether a user has selected to proceed with the uninstallation of the installed program, wherein the calling, with the first uninstall program, of the second uninstall program comprises executing a method to call a module of code within the second uninstall program after determining that the user selected to proceed with uninstallation, further comprising executing the module of code to perform uninstallation operations.

6. The method of claim 5, further comprising:
   determining, with the second uninstall program in response to being called by the first uninstall program, whether the user previously selected to delete installed components;
   determining, with the second uninstall program, whether the second uninstall program indicates that objects the user selected to delete should not be removed during uninstallation; and
   modifying user selected settings to prevent the objects the user selected to delete from being deleted during uninstallation.

7. The method of claim 1, wherein the calling, with the first uninstall program, of the second uninstall program to perform uninstall operations occurs after the first uninstall program deletes the determined installed components.

8. The method of claim 1, wherein the uninstall operations performed by the second uninstall program in response to being called by the first uninstall program comprises at least one operation that is a member of the set of operations comprising:
   modifying system configuration files, deleting files, and deleting objects.

9. A method for uninstalling an installed program comprising installed components, wherein the installed components were installed from file sets, comprising:
   calling a first uninstall program to uninstall the installed program, wherein the first uninstall program is in a first directory;
   calling a class loader to load a second uninstall program, wherein the second uninstall program is maintained in a second directory and wherein the second uninstall program is stored using a file name compatible with different file systems;
   assigning a variable to the second uninstall program after calling the class loader;
   processing, with the first uninstall program, the file sets to determine installed components to delete;
   deleting, with the first uninstall program, the installed components; and
   processing, with the first uninstall program, the variable to call a method in the second uninstall program to perform uninstall operations.

10. The method of claim 9, wherein the second uninstall program is saved as a file name compatible with FAT16 file systems and the first uninstall program is saved with a long file name.

11. A computer system for uninstalling an installed program wherein the installed program was installed from file sets, comprising:
   a computer;
   a memory accessible to the computer, including the installed program, installed components of the installed program, the file sets from which the installed components were installed, a first uninstall program in a first directory, and a second uninstall program in a second directory;
   program logic executed by the computer, comprising:
      (i) means for executing the first uninstall program to uninstall the installed program;
      (ii) means for calling a class loader to load the second uninstall program;
      (iii) means for processing, in response to executing the first uninstall program, the file sets to determine the installed components to delete;
      (iv) means for deleting, in response to executing the first uninstall program, the determined installed components; and
      (v) means for executing, in response to executing the first uninstall program, the second uninstall program to perform uninstall operations.

12. The system of claim 11, wherein the first uninstall program is a general uninstall program that applies across programs to uninstall, and wherein the second uninstall program includes code to perform uninstall operations specific to the program being uninstalled.

13. The system of claim 11, wherein a classpath for the first uninstall program includes the first directory, wherein the second directory is not included in the classpath.

14. The system of claim 11, wherein the program logic further comprises means for calling, in response to executing the first uninstall program after loading the second uninstall program, an initialization method, wherein the initialization method provides the second uninstall program access to all objects and methods to which the first uninstall program has access.

15. The system of claim 11, wherein the program logic further comprises:
   means for determining whether a user has selected to proceed with the uninstallation of the installed program;
   means for executing, in response to processing the first uninstall program, a method to call a module of code within the second uninstall program after determining that the user selected to proceed with uninstallation; and
   means for executing the module of code within the second uninstall program to perform uninstallation operations.

16. The system of claim 15, wherein the program logic further comprises:
   means for determining, in response to executing the second uninstall program, whether the user previously selected to delete installed components;
   means for determining, in response to executing the second uninstall program, whether the second uninstall program indicates that objects the user selected to delete should not be removed during uninstallation; and
   means for modifying user selected settings to prevent the objects the user selected to delete from being deleted during uninstallation.

17. The system of claim 11, wherein the second uninstall program is executed to perform uninstall operations after the first uninstall program deletes the determined installed components.

18. The system of claim 11, wherein the uninstall operations performed in response to executing the second uninstall program comprises at least one operation that is a member of the set of operations comprising: modifying system configuration files, deleting files, and deleting objects.

19. A computer system for uninstalling an installed program wherein the installed program was installed from file sets, comprising:
   a computer;
   a memory accessible to the computer, including the installed program, installed components of the installed program, the file sets from which the installed components were installed, a first uninstall program in a first directory, and a second uninstall program in a second directory;
   program logic executed by the computer, comprising:
   (i) means for executing the first uninstall program to uninstall the installed program;
   (ii) means for calling a class loader to load the second uninstall program, wherein the second uninstall program is stored using a file name compatible with different file systems;
   (iii) means for assigning a variable to the second uninstall program after calling the class loader;
   (iv) means for processing, in response to executing the first uninstall program, the file sets to determine the installed components to delete;
   (v) means for deleting, in response to executing the first uninstall program, the determined installed components; and
   (vi) means, in response to executing the first uninstall program, for processing the variable to call a method in the second uninstall program to perform uninstall operations.

20. The system of claim 19, wherein the second uninstall program is saved with a file name compatible with FAT16 file systems and the first uninstall program is saved with a long file name.

21. An article of manufacture for use in uninstalling an installed program comprised of installed components, wherein the installed components were installed from file sets, the article of manufacture comprising computer useable media accessible to the computer system, wherein the computer usable media includes at least one computer program that is capable of causing the computer system to perform:
   calling a first uninstall program to uninstall the installed program, wherein the first uninstall program is in a first directory;
   calling a class loader to load a second uninstall program, wherein the second uninstall program is maintained in a second directory;
   processing, with the first uninstall program, the file sets to determine installed components to delete;
   deleting, with the first uninstall program, the determined installed components; and
   calling, with the first uninstall program, the second uninstall program to perform uninstall operations.

22. The article of manufacture of claim 21, wherein the first uninstall program is a general uninstall program that applies across programs to uninstall, and wherein the second uninstall program includes code to perform uninstall operations specific to the program being uninstalled.

23. The article of manufacture of claim 21, wherein a classpath for the first uninstall program includes the first directory, wherein the second directory is not included in the classpath.

24. The article of manufacture of claim 21, further comprising calling an initialization method after loading the second uninstall program wherein the initialization method provides the second uninstall program access to all objects and methods to which the first uninstall program has access.

25. The article of manufacture of claim 21, further comprising determining whether a user has selected to proceed with the uninstallation of the installed program, wherein the calling, with the first uninstall program, of the second uninstall program comprises:
   executing a method to call a module of code within the second uninstall program after determining that the user selected to proceed with uninstallation; and
   executing the module of code to perform uninstallation operations.

26. The article of manufacture of claim 25, further comprising:
   determining, with the second uninstall program in response to being called by the first uninstall program, whether the user previously selected to delete installed components;
   determining, with the second uninstall program, whether the second uninstall program indicates that objects the user selected to delete should not be removed during uninstallation; and
   modifying user selected settings to prevent the objects the user selected to delete from being deleted during uninstallation.

27. The article of manufacture of claim 21, wherein the calling, with the first uninstall program, of the second uninstall program to perform uninstall operations occurs after the first uninstall program deletes the determined installed components.

28. The article of manufacture of claim 21, wherein the uninstall operations performed by the second uninstall program in response to being called by the first uninstall program comprises at least one operation that is a member of the set of operations comprising: modifying system configuration files, deleting files, and deleting objects.

29. An article of manufacture for use in uninstalling an installed program comprised of installed components, wherein the installed components were installed from file sets, the article of manufacture comprising computer useable media accessible to the computer system, wherein the computer usable media includes at least one computer program that is capable of causing the computer system to perform:
   calling a first uninstall program to uninstall the installed program, wherein the first uninstall program is in a first directory;
   calling a class loader to load a second uninstall program, wherein the second uninstall program is maintained in a second directory, wherein the second uninstall program is stored using a file name compatible with different file systems;
   assigning a variable to the second uninstall program after calling the class loader; and
   processing, with the first uninstall program, the file sets to determine installed components to delete;
   deleting, with the first uninstall program, the determined installed components; and
   processing, with the first uninstall program, the variable to call a method in the second uninstall program to perform uninstall operations.

30. The article of manufacture of claim 29, wherein the second uninstall program is saved as a file name compatible with FAT16 file systems and the first uninstall program is saved with a long file name.

* * * * *

UNITED STATES PATENT AND TRADEMARK OFFICE
CERTIFICATE OF CORRECTION

PATENT NO. : 6,631,521 B1 Page 1 of 1
DATED : October 7, 2003
INVENTOR(S) : Bryce Allen Curtis It is certified that error appears in the above-identified patent and that said Letters Patent is hereby corrected as shown below:

Column 6,
Line 47, before "Uninstall.java2" insert a paragraph break.

Column 9,
Line 51, "ui=Java1 loadClass (logdir + "unista.cla").newInstance( )." should be part of the pseudocode shown in reduced typeface at line 49.

Signed and Sealed this

Thirty-first Day of May, 2005

JON W. DUDAS
*Director of the United States Patent and Trademark Office*